(12) United States Patent
Lee

(10) Patent No.: US 12,316,769 B2
(45) Date of Patent: May 27, 2025

(54) METHOD AND APPARATUS FOR STORING BLOCKCHAIN TRANSACTION DATA AND DISTRIBUTED STORAGE SYSTEM USING THE SAME

(71) Applicant: ELECTRONICS AND TELECOMMUNICATIONS RESEARCH INSTITUTE, Daejeon (KR)

(72) Inventor: Myung-Cheol Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 309 days.

(21) Appl. No.: 18/058,061

(22) Filed: Nov. 22, 2022

(65) Prior Publication Data

US 2023/0179423 A1 Jun. 8, 2023

(30) Foreign Application Priority Data

Dec. 3, 2021 (KR) .................. 10-2021-0172413
Nov. 3, 2022 (KR) .................. 10-2022-0145312

(51) Int. Cl.
*G06F 16/27* (2019.01)
*H04L 9/32* (2006.01)
*H04L 67/1097* (2022.01)

(52) U.S. Cl.
CPC ............ *H04L 9/3236* (2013.01); *G06F 16/27* (2019.01); *H04L 9/3247* (2013.01); *H04L 67/1097* (2013.01); *H04L 2209/56* (2013.01)

(58) Field of Classification Search
CPC .. H04L 67/1097; H04L 2209/56; G06F 16/27
See application file for complete search history.

(56) References Cited

U.S. PATENT DOCUMENTS

| | | | |
|---|---|---|---|
| 11,233,654 B2 | 1/2022 | Zhuo | |
| 11,372,568 B2* | 6/2022 | Zhu | ............... H04L 9/06 |
| 2019/0146946 A1 | 5/2019 | Zhang | |
| 2020/0412524 A1* | 12/2020 | Das | ............. G06F 16/1824 |
| 2021/0263083 A1 | 8/2021 | Hwang | |

(Continued)

FOREIGN PATENT DOCUMENTS

| | | | | |
|---|---|---|---|---|
| CN | 111209262 A | * | 5/2020 | ........... G06F 16/148 |
| CN | 111837117 A | * | 10/2020 | .......... G06F 11/1044 |

(Continued)

OTHER PUBLICATIONS

Qi Xiaodong et al., "A Reliable Storage Partition for Permissioned Blockchain", IEEE Transactions on Knowledge and Data Engineering, Jan. 1, 2021, vol. 33.

(Continued)

*Primary Examiner* — Tarek Chbouki

(57) ABSTRACT

Disclosed herein is a method for storing blockchain transaction data. The method includes selecting at least one block file storing blockchain transactions as an encoding block file target, generating encoded chunks including parity chunks using the encoding block file target, and making at least one of the encoded chunks correspond to at least one of blockchain nodes to store at least one of the encoded chunks.

13 Claims, 16 Drawing Sheets

(56) References Cited

U.S. PATENT DOCUMENTS

2021/0382620 A1   12/2021  Fang
2021/0409224 A1   12/2021  Heo
2022/0191034 A1*  6/2022  Adams, III ........... H04L 9/3236

FOREIGN PATENT DOCUMENTS

| JP | 2019-532401 A | | 11/2019 | |
| KR | 10-2021-0058744 A | | 5/2021 | |
| KR | 20210058744 A | * | 5/2021 | ........... G06F 16/137 |

OTHER PUBLICATIONS

Xiaodong Qi et al., "BFT-Store: Storage Partition for Permissioned Blockchain via Erasure Coding," 2020 IEEE 36th International Conference on Data Engineering (ICDE), Apr. 2020.

* cited by examiner

~/.bitcoin/blocks
    blk00000.dat
    blk00001.dat
    blk00002.dat

METHOD AND APPARATUS FOR STORING BLOCKCHAIN TRANSACTION DATA AND DISTRIBUTED STORAGE SYSTEM USING THE SAME

CROSS REFERENCE TO RELATED APPLICATIONS

This application claims the benefit of Korean Patent Application No. 10-2021-0172413, filed Dec. 3, 2021, and No. 10-2022-0145312, filed Nov. 3, 2022, which are hereby incorporated by reference in their entireties into this application.

BACKGROUND OF THE INVENTION

1. Technical Field

The present disclosure relates generally to a system for storing blockchain transaction data, and more particularly to technology for increasing the transaction data storage capacity of an entire blockchain system by storing blockchain transaction data in multiple participating nodes in a distributed manner while guaranteeing Byzantine Fault Tolerance.

2. Description of the Related Art

Blockchain technology, which ensures data integrity and reliability by making multiple participants that do not trust each other maintain distributed ledgers in order to solve problems, such as concentration of ownership of personal data in a trusted third party and leakage and manipulation of personal data by a trusted third party, is receiving a lot of attention.

Recently, with the rapid increase in the value of virtual assets, such as Bitcoin, Ethereum, and the like, virtual asset transactions and interest in blockchain technology have rapidly increased. Blockchain technology is attempting to expand the application field thereof to general industry and business beyond the existing field related to virtual assets.

Although application service development and business using blockchain have been attempted in various industrial fields, many attempts have failed due to limitations in scalability of blockchain in connection with consensus, storage, analysis, and the like, and blockchain technology is still used mainly for virtual assets.

The scalability problem with a blockchain storage tier is that the size of a stored ledger (configured with transaction data and state data) rapidly increases when the usability of blockchain increases. When the size of a ledger rapidly increases, general personal computers (PCs) or servers are not able to store and process the ledger.

In most blockchain platforms, such as Bitcoin, Ethereum, Hyperledger Fabric, and the like, a ledger is configured with state data, which is for managing most recent state data about data or assets, and transaction data, which is for managing a history of transactions that cause a change in states. The state data is usually managed using a key/value store or a document store, such as LevelDB, RocksDB, CouchDB, and the like, and the transaction data is managed using files on a file system (in the case of Bitcoin or Hyperledger Fabric) or a key/value store (in the case of Ethereum).

Particularly, transaction data is collected as blocks having a preset size and is reflected to final state data after passing through processes such as consensus between participating nodes, verification by the participating nodes, and the like. The blocks that are agreed on as described above are connected with each other and stored in multiple participating nodes in a distributed manner, thereby playing a role as a shared ledger. Accordingly, data integrity and reliability may be ensured.

However, blockchain transaction data is redundantly stored in all participating nodes, which causes a problem in which excessive disk/memory capacity is required.

The size of Bitcoin transaction data was about 213 GB in April, 2019, and has reached about 360 GB in October, 2021, which is increased by about 150 GB compared to 2019.

Due to the rapid increase in blockchain transaction data and a redundant storage method, a node newly participating in a blockchain network has to spend several days or several weeks receiving existing transaction data, and only nodes having high-performance computing resources and capabilities are able to participate in a blockchain as full nodes. This leads to an increase in the share accounted for by a large-size mining pool, and causes a problem in which data ownership is centralized by running against decentralization.

Recently, various methods for distributed storage of blockchain transactions using a Distributed Hash Table (DHT), sharding, Erasure Code (EC), and the like have been proposed in order to solve a storage capacity problem and a performance problem by distributing blockchain transaction data across participating nodes, rather than redundantly storing the same in the participating nodes.

In the case of DHT-based technology, which is technology for storing and managing a huge amount of data by distributing the same across participating nodes in a network, some research institutes conduct early studies thereon, but many of the studies are only discussed at a theoretical level, rather than actually implemented. Also, some implemented techniques are not quite satisfactory in verifying whether Byzantine fault tolerance is guaranteed, and further studies and validation are required for the practical use thereof.

Sharding-based technology, which is technology for storing data by partitioning the same into multiple logical groups, is configured to partition transaction data based on accounts and redundantly store data only in a corresponding shard, thereby responding to an increase in the size of a ledger. However, complicated processing is required when a transaction between different shards is performed, data is still redundantly stored in a shard, and the problem of vulnerability to malicious attacks is pointed out.

Methods for partitioning and distributed storage of blockchain transaction data based on encoding technology, such as Error Correction Code (ECC), Erasure Code (EC), and the like, which are data-availability guaranteeing methods mainly used in communication systems and storage systems, have been recently researched, but many issues such as the guarantee of Byzantine fault tolerance, encoding/decoding overheads, read performance of blocks that are partitioned and stored in a distributed manner, the necessity for reencoding at the time of adding/removing a participating node, and the like have yet to be solved.

The IEEE paper published in 2020 and titled "BFT-Store: Storage Partition for Permissioned Blockchain via Erasure Coding" proposes technology for generating encoded blocks by applying erasure coding to multiple blocks and storing the same to be distributed across multiple nodes. However, because an environment in which actual blocks are stored in a file or the like is not considered, it is difficult to be applied to existing blockchain systems. Further, it has low efficiency because an access frequency, a computational load, and efficiency of storage space are not considered.

Korean Patent Application Publication No. 10-2021-0058744 proposes technology for applying encoding to one or more blocks and separately storing the encoded blocks in all participating nodes of a blockchain network, but has a problem in that, whenever encoded data is accessed, the encoded blocks have to be collected from multiple nodes and decoded.

Therefore, new blockchain distributed storage technology capable of ensuring optimal performance in consideration of the actual storage of blocks in a blockchain and capable of more efficiently processing access to an encoded block is urgently required.

SUMMARY OF THE INVENTION

An object of the present disclosure is to store blockchain transaction data, which is represented as blocks and stored in the form of files in a file system, to be distributed in multiple participating nodes while guaranteeing Byzantine fault tolerance, thereby solving problems of waste of storage space and concentration of data ownership, which are caused when transaction data is redundantly stored in participating nodes.

Another object of the present disclosure is to enhance storage space management efficiency of a blockchain system such that blockchain technology is used for large-scale data storage/management in various industrial fields.

In order to accomplish the above objects, a method for storing blockchain transaction data, performed by an apparatus for storing blockchain transaction data, according to the present disclosure includes selecting at least one block file storing blockchain transactions as an encoding block file target, generating encoded chunks, including parity chunks, using the encoding block file target, and making at least one of the encoded chunks correspond to at least one of blockchain nodes to store at least one of the encoded chunks.

Here, the number of parity chunks may be M (M being a natural number), the number of blockchain nodes may be 3M+1, the number of encoded chunks may be 3M+1, and the encoded chunks may correspond to the blockchain nodes in a one-to-one manner.

Here, each of the blockchain nodes may store a corresponding one of the encoded chunks without change and store only hash values for at least part of remaining chunks excluding the corresponding one.

Here, the method for storing blockchain transaction data may further include determining whether the number of blocks included in the encoding block file target is 2M+1, and when the number of blocks included in the encoding block file target is not equal to 2M+1, generating 2M+1 encoding target blocks using the blocks included in the encoding block file target and replicated blocks, which are part of the blocks included in the encoding block file target. Here, the encoded chunks may be generated by performing encoding using the encoding target blocks.

Here, the replicated blocks may be selected from among the blocks included in the encoding block file target based on an access frequency.

Here, the encoding block file target may include 2M+1 or fewer blocks.

Here, the 2M+1 or fewer blocks may have different sizes, and padding may be added thereto based on a maximum block size before the encoded chunks are generated.

Here, the encoding block file target may be selected from among block files storing the blockchain transactions in consideration of frequencies of access to the block files or blocks included in the block files.

Here, the hash value may be used to verify a block read from another node.

Here, 2M+1 or more of the encoded chunks may be used for decoding for restoring the encoding target blocks.

Also, an apparatus for storing blockchain transaction data according to an embodiment of the present disclosure includes one or more processors and executable memory for storing at least one program executed by the one or more processors.

Here, the at least one program may select at least one block file storing blockchain transactions as an encoding block file target, generate encoded chunks, including parity chunks, using the encoding block file target, and make at least one of the encoded chunks correspond to at least one of blockchain nodes to store at least one of the encoded chunks.

Here, the number of parity chunks may be M (M being a natural number), the number of blockchain nodes may be 3M+1, the number of encoded chunks may be 3M+1, and the encoded chunks may correspond to the blockchain nodes in a one-to-one manner.

Here, each of the blockchain nodes may store a corresponding one of the encoded chunks without change and store only hash values for at least part of remaining chunks excluding the corresponding one.

Here, the at least one program may determine whether the number of blocks included in the encoding block file target is 2M+1, and when the number of blocks included in the encoding block file target is not equal to 2M+1, the at least one program may generate 2M+1 encoding target blocks using the blocks included in the encoding block file target and replicated blocks, which are part of the blocks included in the encoding block file target. Here, the encoded chunks may be generated by performing encoding using the encoding target blocks.

Here, the replicated blocks may be selected from among the blocks included in the encoding block file target based on an access frequency.

Here, the encoding block file target may include blocks having different sizes, and padding may be added to the blocks having the different sizes based on a maximum block size before the encoded chunks are generated.

Here, the encoding block file target may be selected from among block files storing the blockchain transactions in consideration of frequencies of access to the block files or blocks included in the block files.

Here, the hash value may be used to verify a block read from another node.

Here, 2M+1 or more of the encoded chunks may be used for decoding for restoring the encoding target blocks.

Also, a system for distributed storage of blockchain transaction data according to an embodiment of the present disclosure includes a first blockchain node for storing a first chunk, among encoded chunks, without change and storing hash values corresponding to remaining chunks excluding the first chunk; and a second blockchain node for storing a second chunk, which differs from the first chunk, without change and storing hash values corresponding to remaining chunks excluding the second chunk.

Here, the encoded chunks may be generated based on encoding performed using an encoding block file target selected from among block files storing blockchain transactions.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
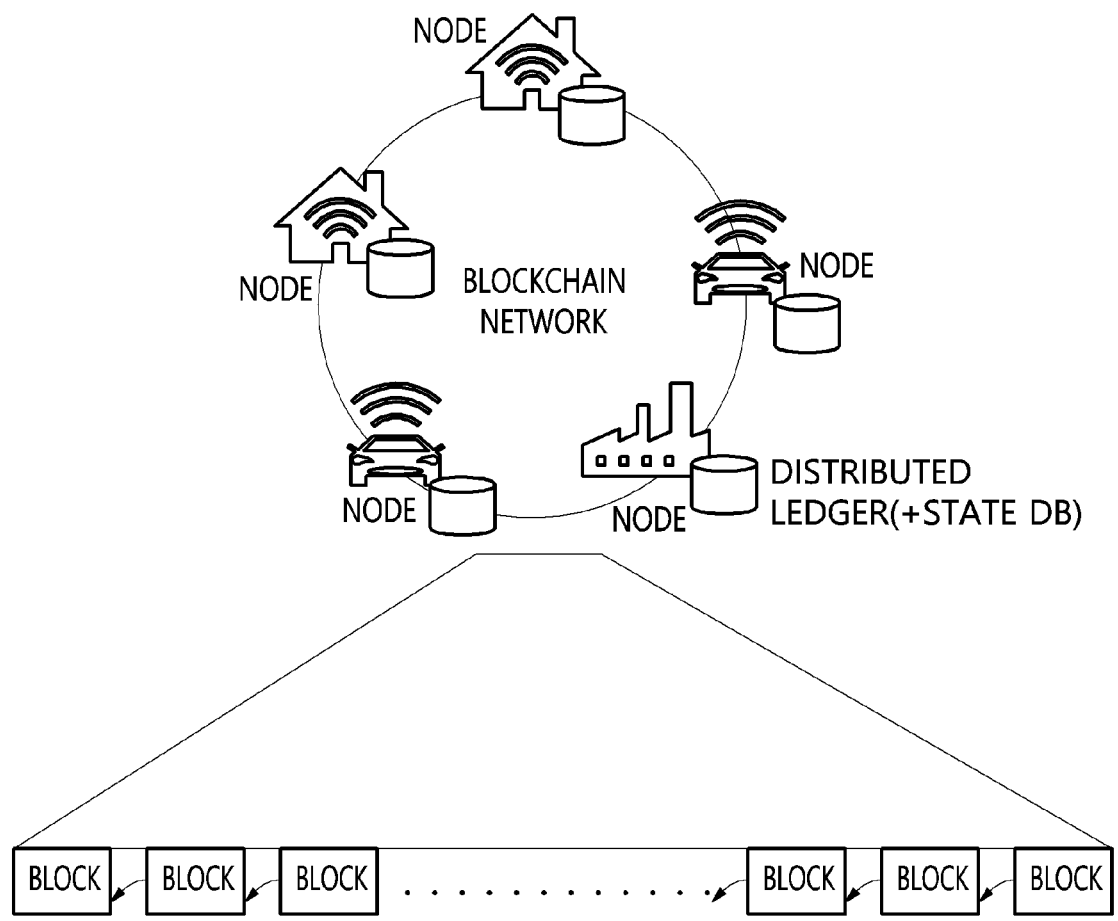
FIG. 1 is a block diagram illustrating a system for distributed storage of blockchain transaction data according to an embodiment of the present disclosure.

The advantages and features of the present disclosure and methods of achieving the same will be apparent from the exemplary embodiments to be described below in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only, and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated components or steps, but do not preclude the presence or addition of one or more other components or steps.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a block diagram illustrating a system for distributed storage of blockchain transaction data according to an embodiment of the present disclosure.

Referring to FIG. 1, when transaction data for managing a history of transactions in the form of a chain of blocks (a blockchain) is redundantly stored in participating nodes in the system for distributed storage of blockchain transaction data, a problem in which excessive disk/memory capacity is required may be caused.

The blockchain nodes illustrated in FIG. 1 may include a first blockchain node, which stores a first chunk, among encoded chunks, without change and stores hash values corresponding to remaining chunks excluding the first chunk, and a second blockchain node, which stores a second chunk, which differs from the first chunk, without change and stores hash values corresponding to remaining chunks excluding the second chunk. Here, the encoded chunks may be generated based on encoding that is performed using an encoding block file target selected from among block files, each storing blockchain transactions. Here, the encoding block file target may correspond to one or more block files. For example, the encoding block file target may correspond to a single block file, may correspond to two block files, or may correspond to ten block files.

The system for distributed storage of blockchain data according to an embodiment of the present disclosure is configured such that at least some of nodes for storing blockchain transaction data encode blockchain transaction data in units of block files and store only some of the encoded chunks without change, thereby minimizing the disk/memory space required in each of the nodes of the blockchain transaction data storage system.

Figure 2:
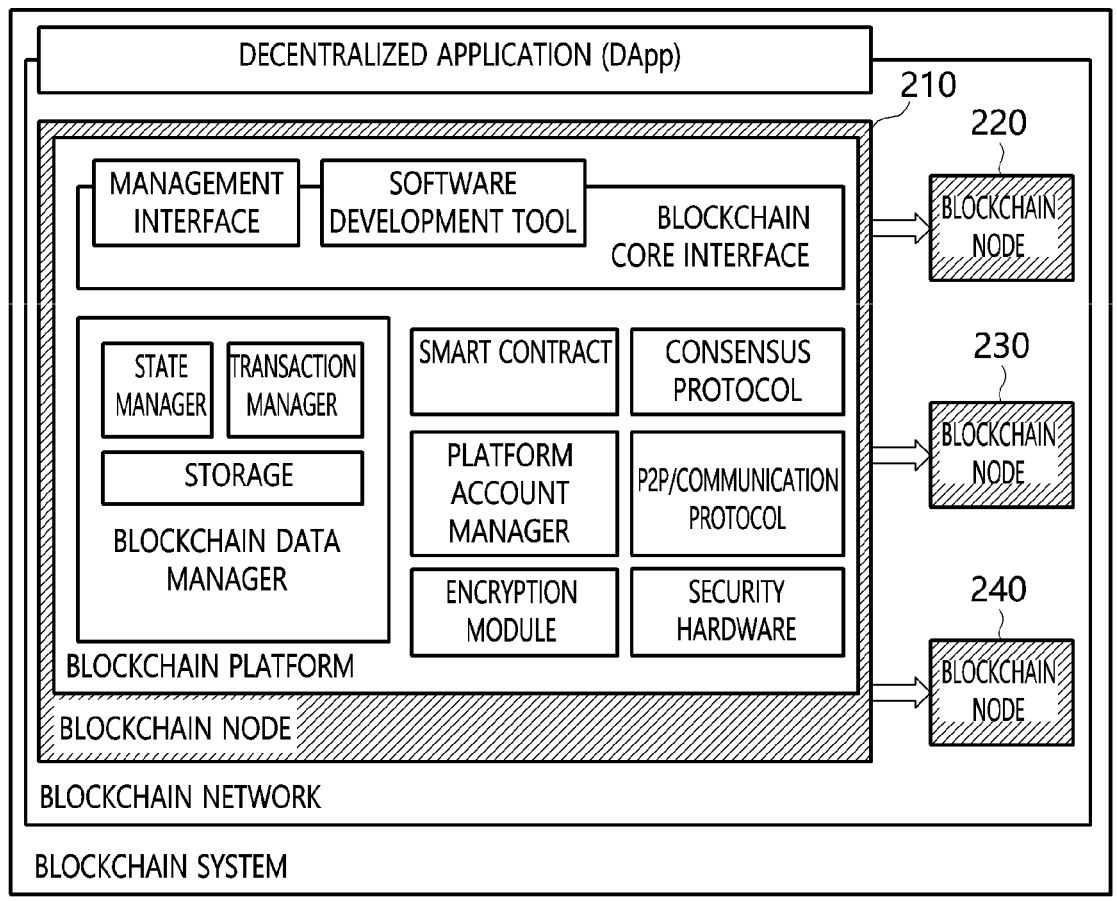
FIG. 2 is a block diagram illustrating the structure of a system for distributed storage of blockchain transaction data according to an embodiment of the present disclosure.

FIG. 2 is a block diagram illustrating the structure of a system for distributed storage of blockchain transaction data according to an embodiment of the present

DISCLOSURE

Referring to FIG. 2, the system for distributed storage of blockchain transaction data according to an embodiment of the present disclosure may be constructed in the form of a blockchain network configured with multiple blockchain nodes 210, 220, 230, and 240 that share blockchain data.

The blockchain node 210 may be configured with a blockchain data manager for ensuring data reliability, a blockchain core interface for development of application programs, and modules for other foundation and application techniques.

Here, the blockchain data manager may include storage, a state manager, and a transaction manager.

Here, the blockchain core interface may include a management interface and a software development tool.

Here, the modules for other foundation and application techniques may include an encryption module, security hardware, a platform account manager, a P2P/communication protocol unit, a consensus protocol unit, and a smart contract unit.

The decentralized application DApp illustrated in FIG. 2 may provide a user with a trust-based data storage/management application service using functions and interfaces provided by a blockchain platform and a blockchain network.

Figure 3:
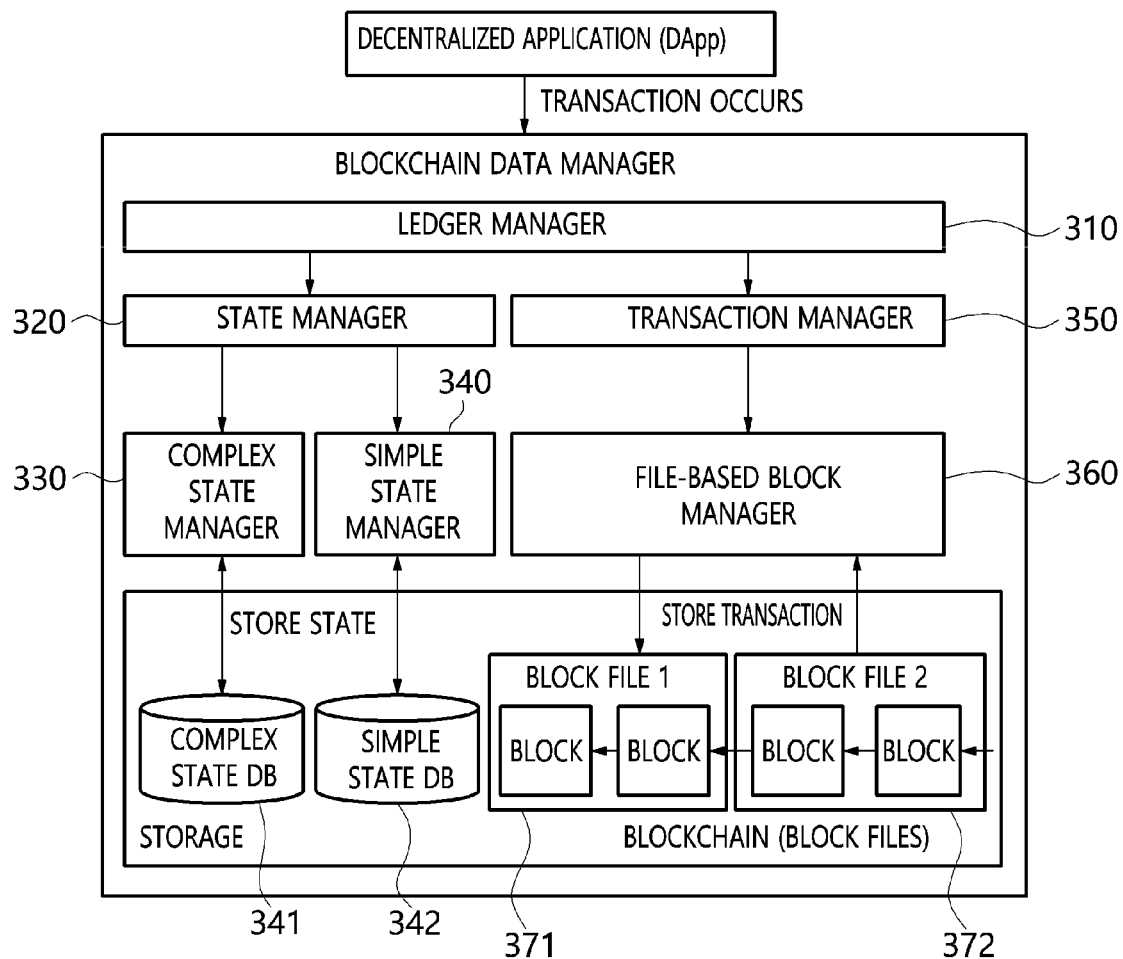
FIG. 3 is a block diagram illustrating an example of the blockchain data manager illustrated in FIG. 2.

FIG. 3 is a block diagram illustrating an example of the blockchain data manager illustrated in FIG. 2.

Referring to FIG. 3, the blockchain data manager may include a ledger manager 310, a state manager 320, a complex state manager 330, a simple state manager 340, a complex state database 341, a simple state database 342, a transaction manager 350, a file-based block manager 360, and block files 371 and 372.

The blockchain data manager illustrated in FIG. 3 provides the function of managing a blockchain ledger (configured with state data and transaction data).

A transaction generated in a decentralized application DApp is delivered to the state manager 320 and the transaction manager 350 via the ledger manager 310.

The state manager 320 is configured with the complex state manager 330 and the simple state manager 340, and the transaction manager 350 may be configured with the file-based block manager 360.

Storage may be configured with the complex state database 341 and the simple state database 342 for storing states and a blockchain in the form of block files storing transactions.

Although not explicitly illustrated in FIG. 3, the block files in the storage are encoded in units of block files, whereby encoded chunks may be generated. Also, each of the blockchain nodes may store only one of the encoded chunks without change and store only hash values for the remaining chunks.

Figure 4:
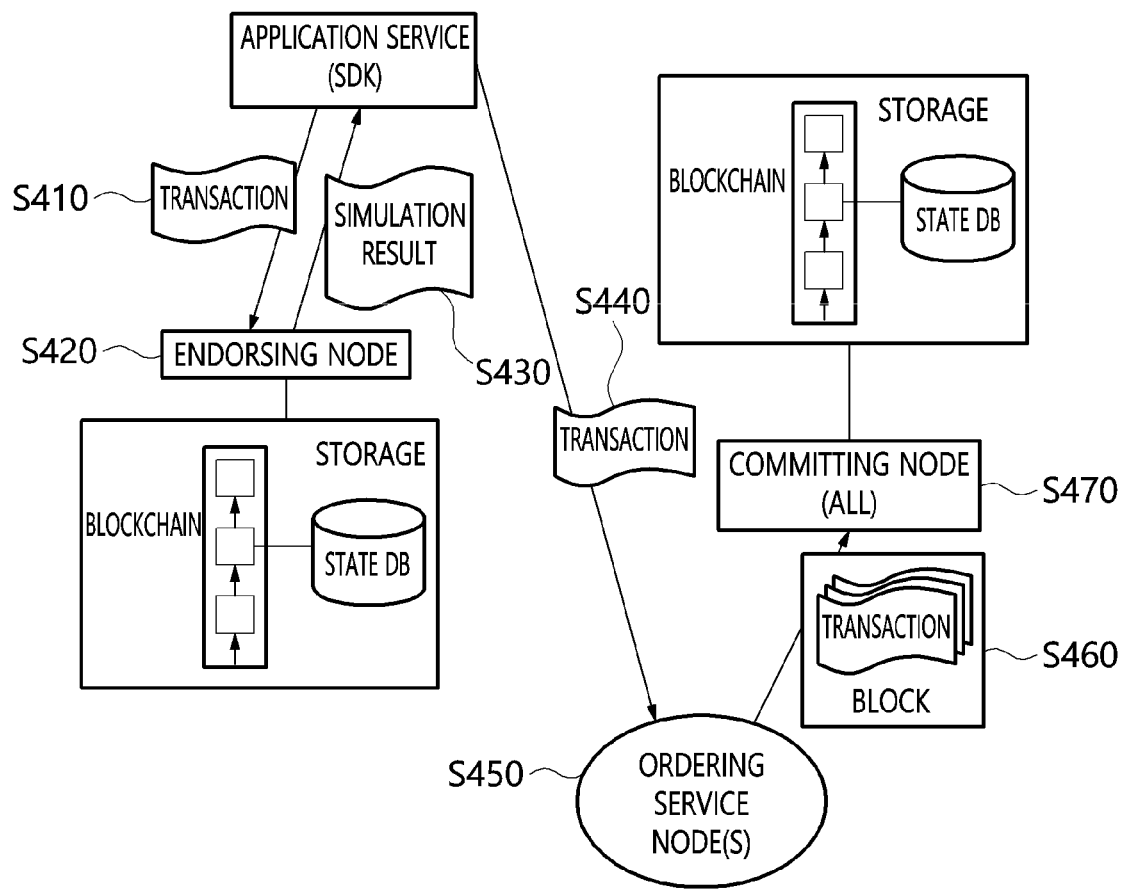
FIG. 4 is a view illustrating a blockchain data storage flow in a system for distributed storage of blockchain transaction data according to an embodiment of the present disclosure.

FIG. 4 is a view illustrating a blockchain data storage flow in a system for distributed storage of blockchain transaction data according to an embodiment of the present disclosure.

Referring to FIG. 4, a blockchain application service (SDK) delivers a transaction to an endorsing node, among blockchain nodes, at step S410.

The endorsing node performs a smart contract in order to simulate the received transaction therein, generates a simulation result at step S420, and delivers the generated simulation result to the application service at step S430.

The application service submits the transaction including the simulation result to an ordering service node (the node to generate a block) at step S440.

The ordering service node collects the transactions submitted thereto, decides the order of the transactions, and configures a block at step S450.

When a block is configured, the block is delivered to all committing nodes (nodes to store the block) at step S460.

Each of the committing nodes verifies the respective transactions in the received block and commits the same to the storage in the node at step S470. Here, the blockchain (a history of transaction data) and state data are changed. A new transaction is recorded in the form of a block at the tail of the existing blockchain, and the existing state data is updated with a new value.

In the example illustrated in FIG. 4, the endorsing node may play a role of a committing node as well as the role of the endorsing node.

Figures 5, 6:
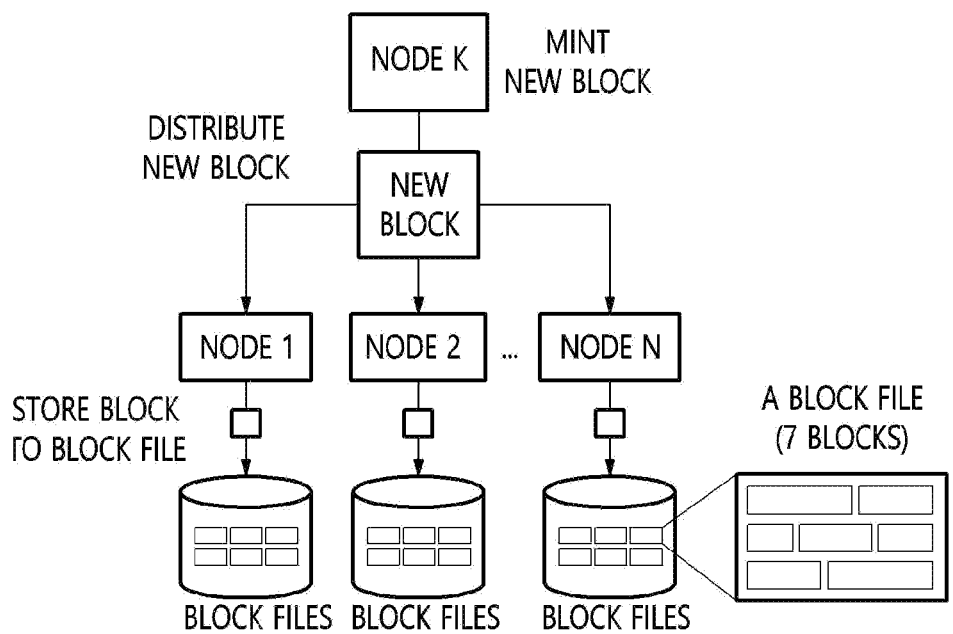
FIG. 5 is a block diagram illustrating the concept of block file storage.
FIG. 6 is a view illustrating an example of a list of block files, each of which is a format in which blocks are stored, in a file system.

FIG. 5 is a block diagram illustrating the concept of block file storage.

Referring to FIG. 5, it can be seen that a block (a bundle of transaction data) is generated, and the generated block is distributed to respective nodes and stored in the form of a block file based on a file system in the respective nodes.

That is, when a new block is generated by an ordering service node in the blockchain data storage flow illustrated in FIG. 4, the new block is distributed to committing nodes and is stored in the form of a block file. This can be seen as a block mining process.

The committing node does not store the received block in a separate file, but collects the same to be stored in a block file having a fixed size. Accordingly, a single block file contains multiple blocks. Here, the respective committing nodes may redundantly manage the same block and block file for consistency of blockchain data, in which case a problem of a lack of storage space may be caused.

FIG. 6 is a view illustrating an example of a list of block files, each of which is a format in which blocks are stored, in a file system.

Referring to FIG. 6, it can be seen that a block of Bitcoin is stored in the block file 'blkNNNNN.dat' in the directory '~/.bitcoin/blocks' in every node. Blocks are first stored in the block file 'blk00000.dat', and when the size of the block file reaches the maximum size, the block is stored in a subsequent file. For example, the size of a block of Bitcoin is 1 MB on average, the maximum size of a block file is defined as MAX_BLOCKFILE_SIZE, and the default value of MAX_BLOCKFILE_SIZE may be 128 MiB (134,271,728 bytes). For example, Hyperledger Fabric collects multiple blocks and stores the same in a single block file, similar to Bitcoin. Here, the default value of the maximum block file size may be 64 MB.

Figure 7:
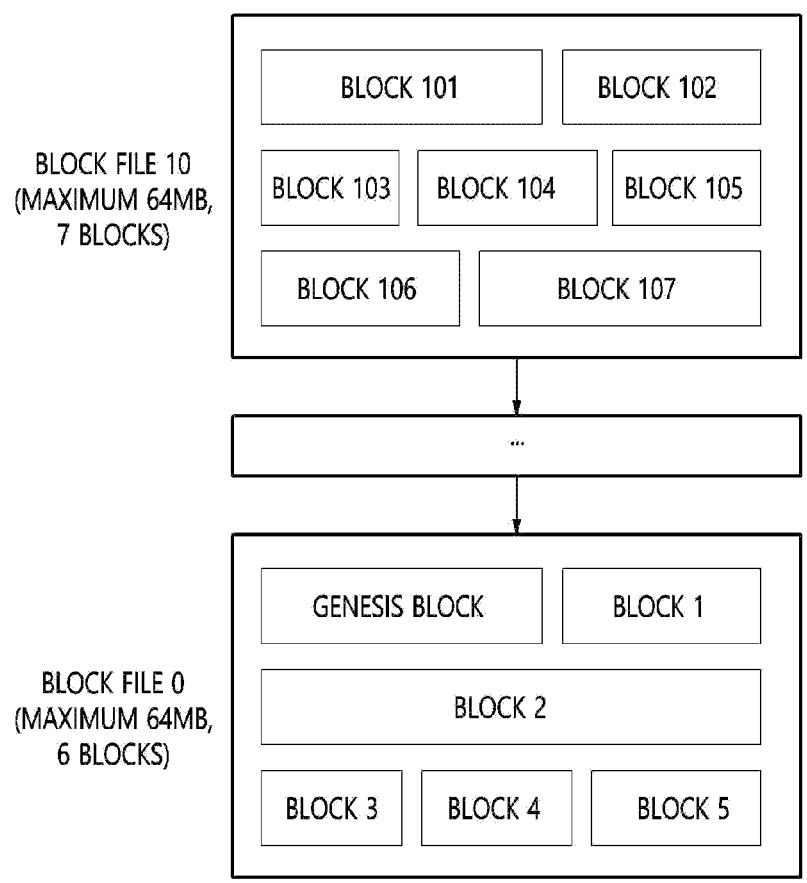
FIG. 7 is a view illustrating an example of a block file storage structure.

FIG. 7 is a view illustrating an example of a block file storage structure.

Referring to FIG. 7, it can be seen that blocks are stored in the form of a block file. The example in FIG. 7 may illustrate block files and the storage structure of blocks stored in a block file in a blockchain system, such as Bitcoin, Hyperledger Fabric, or the like.

Unlike Bitcoin or Hyperledger Fabric, Ethereum may store a block, in which transactions are recorded, in a transaction trie. Here, a transaction trie may be a form of modified Merkle Patricia Trie (MPT), and MPT may store data using a key/value store such as LevelDB or RocksDB in order to ensure persistence.

Figure 8:
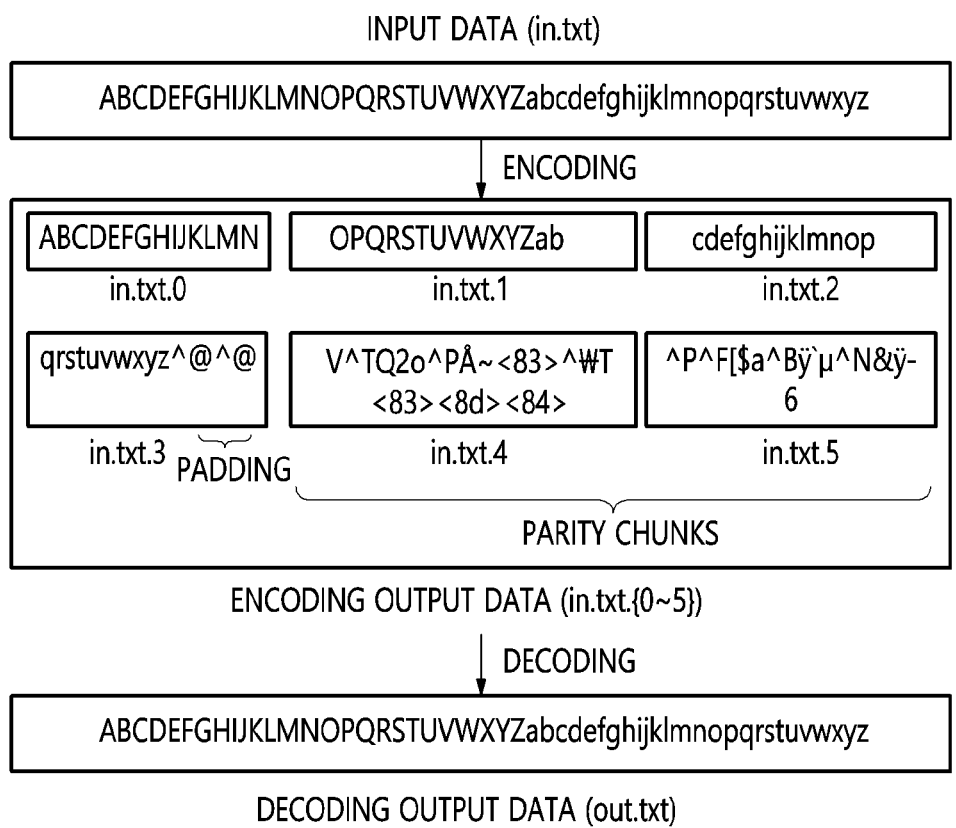
FIG. 8 is a view illustrating an example of the case in which encoding is applied in units of block files according to an embodiment of the present disclosure.

FIG. 8 is a view illustrating an example of the case in which encoding is applied in units of block files according to an embodiment of the present disclosure. Here, data availability may be ensured by applying encoding in units of block files.

Referring to FIG. 8, input data (in.txt) in the form of text may be managed by being encoded into K+M chunks (K=4, M=2).

The input data may be stored by being partitioned into K (=4) data chunks having the same size. Here, in order to ensure data availability, M (=2) parity chunks having the same size may be generated. Here, K may be the number of data chunks corresponding to the input data, and M may be the number of data chunks corresponding to parity.

The data encoded into K+M chunks as described above has availability based on which the original input data (in.txt) is able to be restored even in the event of M faults.

That is, in the example illustrated in FIG. 8, (4,2) encoding may be applied to the input data (in.txt). Here, because K and M are 4 and 2, respectively, the original data is partitioned into four chunks and two parity chunks for ensuring availability may be generated. Here, all of the six chunks may have the same size. If the remainder of the size of the input data divided by K is not 0, the last chunk (in.txt.3) may be padded by adding a preset value, such as a null value (\0) or the like, to the data so as to have the same size as the other chunks, whereby all chunks may have the same size.

As described above, the six chunks encoded in a unit of block file may be stored in different nodes. Here, when a fault or a Byzantine fault occurs in up to two nodes (at least four chunks are available), output data (out.txt) that is the same as the original data (in.txt) may be restored through decoding. When a fault occurs in only the parity chunks (in.txt.4 and in.txt.5) and when all of the four original data chunks (in.txt.0, in.txt.1, in.txt.2, and in.txt.3) are accessible, a decoding process is skipped, and the original data (in.txt) is restored merely by concatenating the original data chunks, whereby decoding time may be saved.

As shown in the example in FIG. 8, when K is 4 and M is 2, the storage space efficiency shown in Table 1 below may be acquired. Here, it can be seen that the encoding method provides higher storage space efficiency (which uses storage space that is 1.58 times the size of the original data) than the existing replication method used for ensuring availability (which uses storage space that is three times the size of the original data).

TABLE 1

|  | replication method (two replications) | encoding method (two parities) |
|---|---|---|
| storage space usage | 53 bytes * 3 = 159 bytes | 14 bytes * 6 = 84 bytes |
| storage space load | 159 bytes/53 bytes = 3 times the space is used | 84 bytes/53 bytes = 1.58 times the space is used |

For example, encoding may be performed using any of various methods, such as Reed-Solomon, Cauchy Reed-Solomon, Vandermonde Reed-Solomon, Fountain Code, Local Reconstruction Code (or Local Repairable Code), and the like, which have different characteristics from the aspects of whether to maintain original data, storage space efficiency, the degree of availability, the encoding/decoding speed, whether reencoding is required, and the like. In the method for distributed storage of blockchain transaction data based on block file encoding according to the present disclosure, one or more of the various encoding methods may be selected and used. Hereinafter, for easy understanding of the method proposed by the present disclosure, a description will be made with an example in which a Reed-Solomon method, which is the most basic encoding method, is used. When data is encoded in units of block files to make a total of K+M (=3M+1) chunks such that K>=2M+1, which is the condition for Byzantine Fault Tolerance, is satisfied and when the respective chunks are separately stored in K+M=3M+1 nodes, the capability of restoring the original data, that is, Byzantine Fault Tolerance (BFT), in the event of a physical node fault or Byzantine behavior occurring in up to ⅓ of all of the nodes may be obtained.

However, after encoding is applied, when only some chunks, among the original data, are stored in each node, if it is necessary to access a chunk that is not possessed by the corresponding node, the data has to be received from another node, which causes an access time delay problem. Accordingly, when an encoding method is applied to a data storage system, encoding has to be applied in consideration of read speed.

The present disclosure applies encoding for blockchain transaction data storage based on a block file in order to make use of high storage-space efficiency of the encoding method, thereby minimizing the storage space required in each blockchain node while ensuring high availability such that Byzantine fault tolerance is guaranteed. Particularly, the present disclosure applies encoding in units of block files, rather than in units of transactions or blocks, in consideration of the characteristics of storage of an actual blockchain system.

Figure 9:
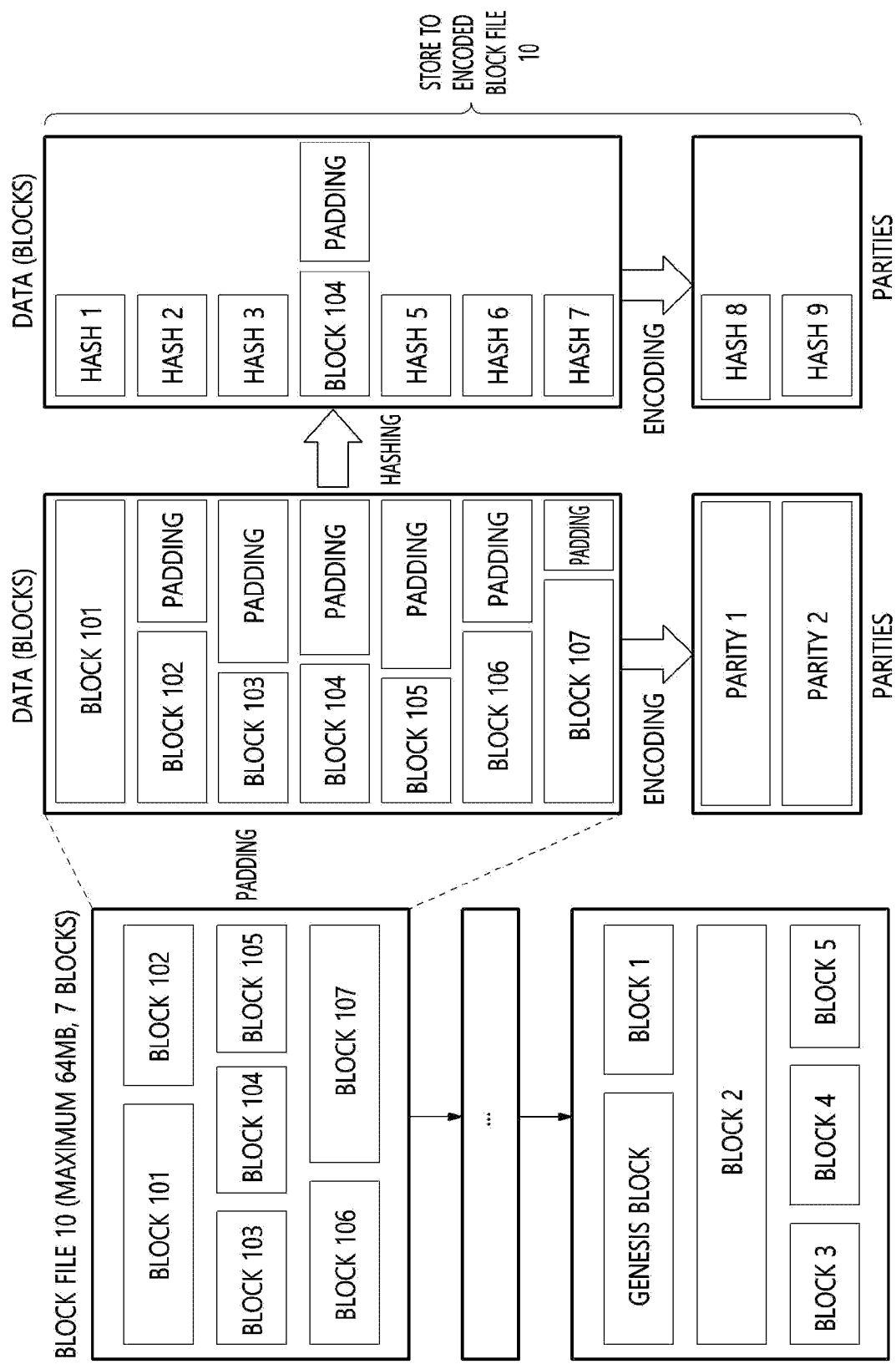
FIG. 9 is a block diagram illustrating an example of a blockchain transaction data encoding method based on block file encoding according to an embodiment of the present disclosure.

FIG. 9 is a block diagram illustrating an example of a method for encoding blockchain transaction data based on block file encoding according to an embodiment of the present disclosure.

Referring to FIG. 9, it can be seen that encoding is applied in units of block files, rather than encoding a single block or performing encoding so as to make the number of encoded blocks equal to the number of nodes.

That is, the present disclosure applies encoding for distributed storage of blockchain transaction data, but applies encoding by taking into account a general block storage structure of a blockchain system in which multiple blocks are stored in a single block file, as in Bitcoin or Hyperledger Fabric.

In the example illustrated in FIG. 9, blocks are stored in block files (BLOCK FILE 0, . . . , BLOCK FILE 10, . . . ), and multiple blocks having different sizes are stored in each of the block files. For example, blocks from BLOCK 101 to BLOCK 107 are stored in BLOCK FILE 10. The size of each of the block files cannot exceed the maximum block file size (e.g., 64 MB) set in the blockchain system. Blocks having different sizes may be generated depending on the maximum block size set in the blockchain system, a block generation period, the amount of transactions generated at a block generation time, the sizes of transactions generated at a block generation time, and the like.

Here, each blockchain node may be assigned one of encoded chunks.

In the example of FIG. 9, a blockchain node stores and manages an original data block for the assigned block (block 104) and stores and manages only hash values of blocks for the blocks that are not assigned thereto (blocks 101, 102,

103, 105, 106, and 107, and parities 1 and 2). Accordingly, each node stores information about all of the blocks distributed thereto. However, for the blocks that are not assigned at the encoding time, each node stores only hash values of the blocks, which occupies small space, thereby saving the storage space. Here, when access to a corresponding block is required and provided from another node, the hash value may be used in order to check whether the block is tampered with.

In the example in FIG. 9, the case in which encoding is applied to a single block file is illustrated, but the method for distributed storage of blockchain transaction data based on block file encoding according to the present disclosure may apply encoding to multiple block files in consideration of the number of blocks and the number of nodes.

The criteria for selecting the block file to which encoding is to be applied, among multiple block files stored in advance, may be as follows:
  select the least frequently accessed block or block file.
  select an old block or block file.
  in consideration of the number of nodes, select blocks or block files adjacent to a block (block file) that is selected when required.

Figure 10:
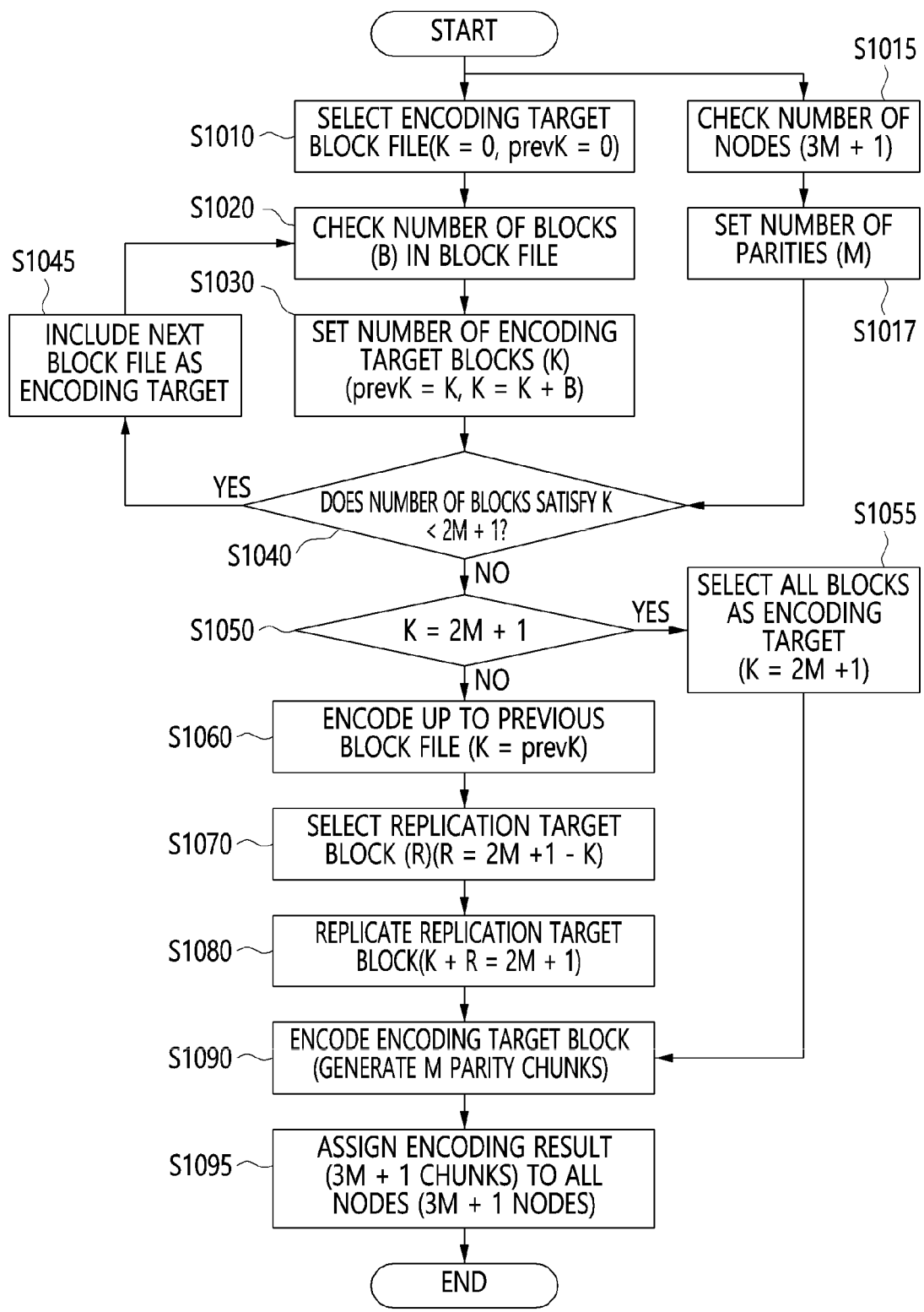
FIG. 10 is a flowchart illustrating a method for storing blockchain transaction data according to an embodiment of the present disclosure.

FIG. 10 is a flowchart illustrating a method for storing blockchain transaction data according to an embodiment of the present disclosure.

Referring to FIG. 10, in the method for storing blockchain transaction data according to an embodiment of the present disclosure, the number of blockchain nodes (3M+1) is checked at step S1015.

Also, in the method for storing blockchain transaction data according to an embodiment of the present disclosure, the number of parity chunks is set to M at step S1017.

Here, the number of blockchain nodes may be set to 3M+1. That is, when the number of blockchain nodes is set, the number of parity chunks suitable therefor may be set. Conversely, when the number of parity chunks is set, the number of blockchain nodes suitable therefor may be set.

At step S1015, when the number of nodes is N, encoding satisfying the condition of N=3M+1 has to be applied in order to guarantee Byzantine fault tolerance of transaction data, and encoding has to be performed so as to generate M parity chunks at the time of encoding. Also, the number of encoding target blocks (K), that is, the number of blocks included in an encoding block file target or encoding block files, should be 2M+1.

Meanwhile, in the method for storing blockchain transaction data according to an embodiment of the present disclosure, first, one of previously stored block files is selected as an encoding target block file, and parameters K and prevK are initialized at step S1010.

Here, the encoding target block file may be selected from among block files storing blockchain transactions in consideration of the frequency of access to block files or blocks contained in the block files.

Here, the parameter K may denote the number of encoding target blocks, and the parameter prevK may denote the number of encoding target blocks of up to the previous block file.

Also, in the method for storing blockchain transaction data according to an embodiment of the present disclosure, the number of blocks (B) included in the block file is checked at step S1020.

Here, the respective block files may include different numbers of blocks.

Also, in the method for storing blockchain transaction data according to an embodiment of the present disclosure, the number of encoding target blocks (K) is set at step S1030.

That is, at step S1030, blocks included in the corresponding block file are included in the encoding target blocks, and the number thereof is counted.

Here, the parameter prevK may be set to K, and the parameter K may be set to K+B. Here, setting the parameter prevK to K is for storing the number of encoding target blocks (K), calculated by including up to the previous block file, in the parameter prevK.

Also, in the method for storing blockchain transaction data according to an embodiment of the present disclosure, whether the number of encoding target blocks (K) is less than 2M+1 (M being the number of parity chunks) is determined at step S1040.

When the number of encoding target blocks (K) included in the encoding target block file(s) is less than 2M+1, blocks of the subsequent block file are added to the encoding target blocks such that a total of 2M+1 blocks is set as encoding targets, whereby the number of encoding target blocks (K) approaches 2M+1 at step S1045.

After step S1045 is performed, step S1020 is performed again.

When the number of encoding target blocks (K) included in the encoding target block file(s) is equal to or greater than 2M+1, whether the number of encoding target blocks (K) included in the encoding target block file(s) is equal to 2M+1 is determined at step S1050.

When it is determined at step S1050 that the number of encoding target blocks (K) included in the encoding target block file(s) is equal to 2M+1, all of the K (=2M+1) encoding target blocks are selected as the targets to be encoded at step S1055.

When it is determined at step S1050 that the number of encoding target blocks (K) included in the encoding target block file(s) is not equal to 2M+1, this means that K>2M+1 is satisfied, so only up to the previous block file is set as the encoding block file target at step S1060.

Here, the encoding block file target may indicate an integer number of one or more encoding target files.

When only up to the previous block file is set as the encoding block file target, as described above, the number of encoding target blocks is less than 2M+1, so replication target blocks R are selected in order to compensate for an insufficient number of blocks at step S1070.

Here, the number of selected replication target blocks (R) may be 2M+1−K.

Here, the replication target blocks may be selected from among blocks included in the encoding block file target based on an access frequency. For example, the replication target blocks may be blocks selected in descending order of access frequency, among the blocks in the corresponding block file.

Compared to a block that is not replicated, a block replicated as described above is possessed by a larger number of nodes, that is, the number of nodes having the corresponding block is increased. Accordingly, when the block is requested to be read, even though encoding is applied to the block, access delay may be reduced, whereby an increase in the time taken to access the block is minimized.

Also, in the method for storing blockchain transaction data according to an embodiment of the present disclosure, the selected replication target blocks are replicated, whereby the total number of encoding targets becomes 2M+1 at step S1080.

When 2M+1 encoding target blocks are selected by step S1080 or S1055, encoding is performed on the encoding target blocks, whereby encoded chunks including M parity chunks are generated at step S1090.

Here, the encoding target blocks may have different sizes. Here, padding may be added to the encoding target blocks based on the maximum block size before encoded chunks are generated.

Also, in the method for storing blockchain transaction data according to an embodiment of the present disclosure, 3M+1 chunks corresponding to the encoding result are mapped to a total of 3M+1 blockchain nodes in a one-to-one manner at step S1095.

Here, each of the blockchain nodes may store only the chunk mapped thereto without change and store only hash values for the other chunks.

Consequently, encoding is performed on the 2M+1 encoding target blocks through the method illustrated in FIG. 10, whereby 3M+1 chunks, including 2M+1 original data blocks (chunks) and M parity chunks, are generated. Then, these 3M+1 chunks are assigned to N (=3M+1) blockchain nodes, respectively.

Figure 11:
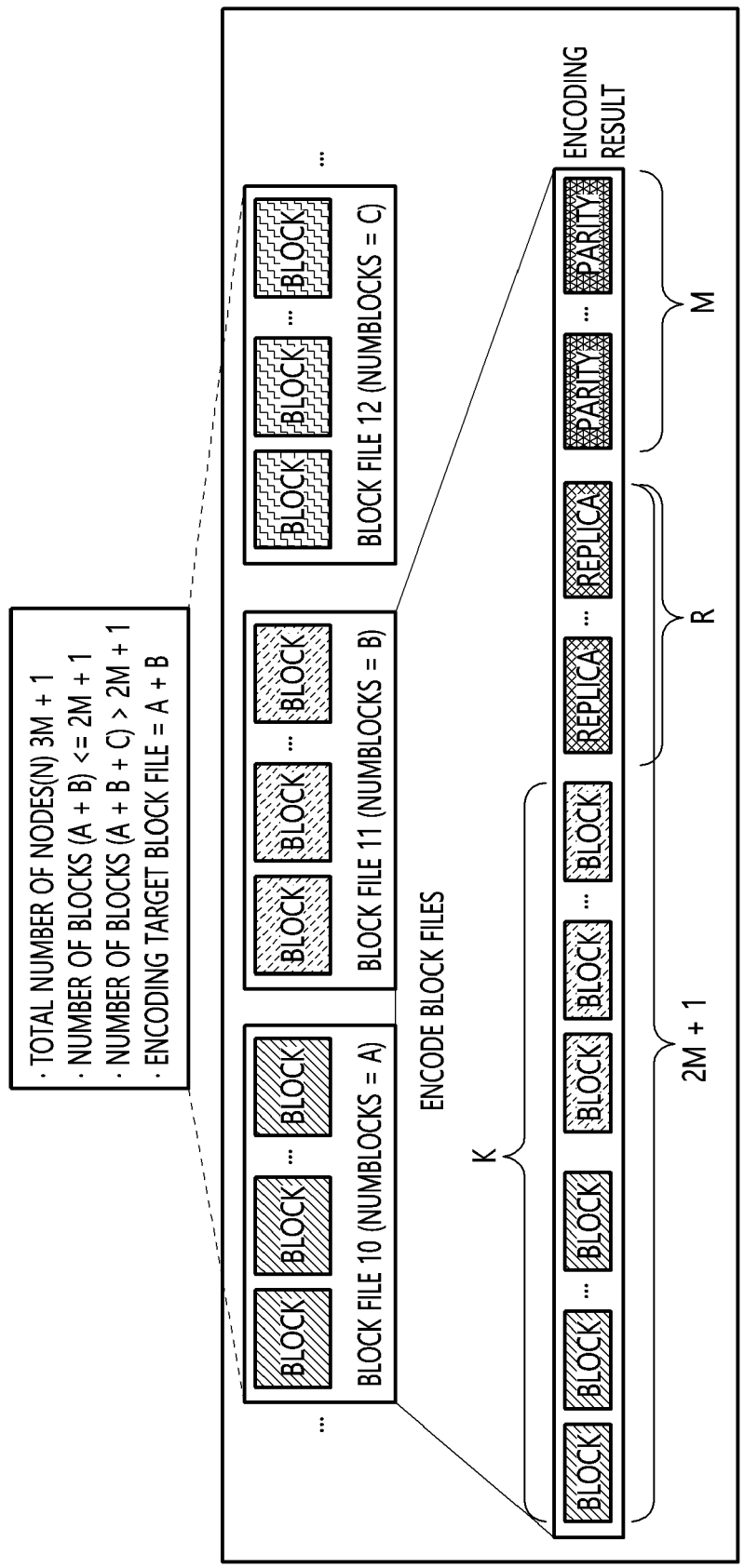
FIG. 11 is a view illustrating an example in which blockchain transaction data encoding is applied based on multiple block files.

FIG. 11 is a view illustrating an example in which blockchain transaction data encoding is applied based on multiple block files.

Referring to FIG. 11, it can be seen that encoding is applied to two block files BLOCK FILE 10 and BLOCK FILE 11 among multiple block files BLOCK FILE 10, BLOCK FILE 11, BLOCK FILE 12, . . . .

In FIG. 11, K denotes original data blocks, R denotes replicated blocks, and M denotes parity chunks.

In the example illustrated in FIG. 11, it can be seen that the number of blocks included in encoding target block files BLOCK FILE 10 and BLOCK FILE 11 is less than 2M+1, a total of 2M+1 encoding target blocks are selected by selecting R replication targets and replicating the same, and encoding is performed on the 2M+1 encoding target blocks, whereby M parity chunks are generated. In order to maintain original data (2M+1 data chunks) after encoding is performed as described above, systematic encoding may be applied.

As the result of encoding, 3M+1 encoded chunks, including a total of 2M+1 original data chunks and M parity chunks, are generated.

Figure 12:
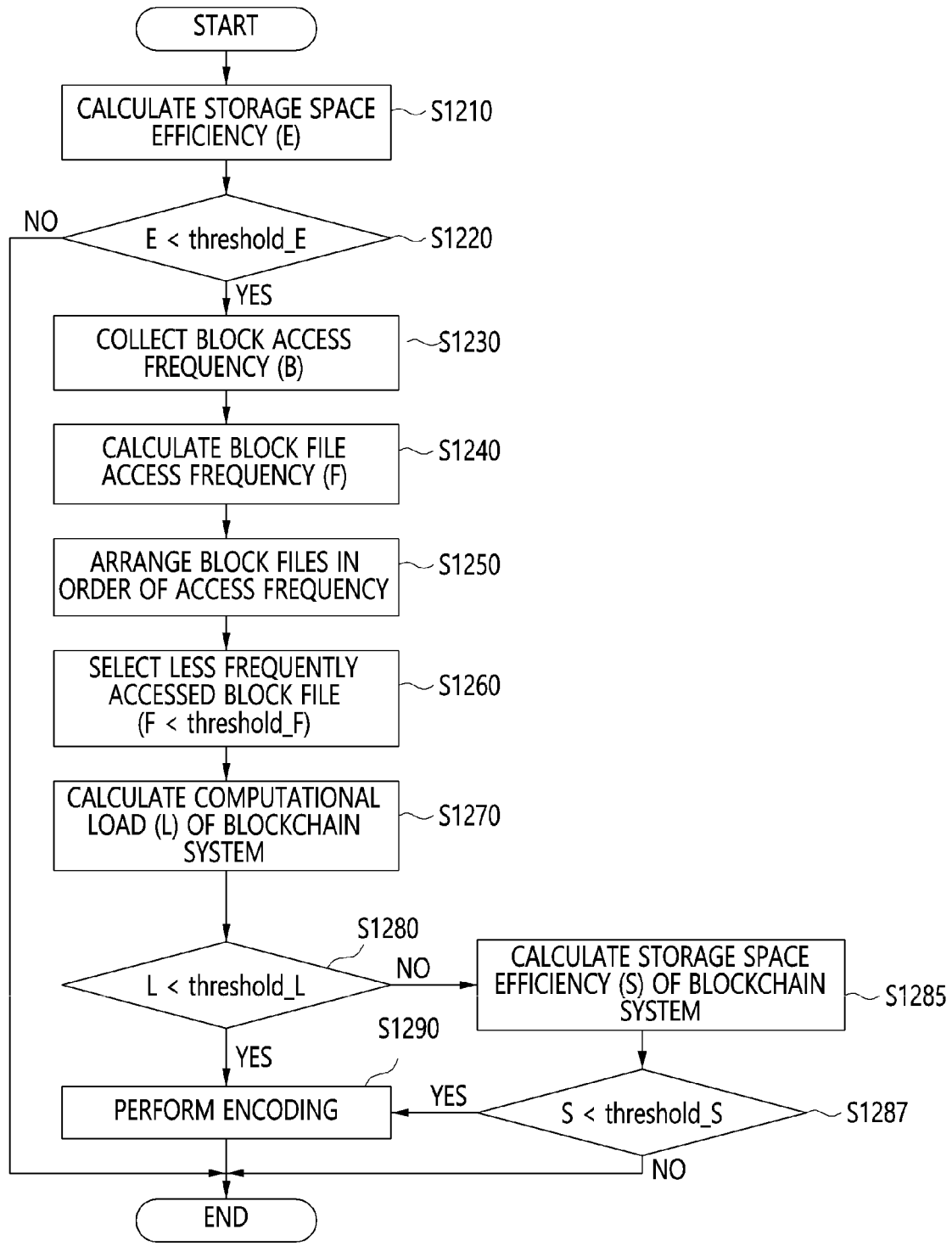
FIG. 12 is a flowchart illustrating a method for selecting an encoding target block file according to an embodiment of the present disclosure.

FIG. 12 is a flowchart illustrating a method for selecting an encoding target block file according to an embodiment of the present disclosure.

The method for selecting an encoding target block file according to an embodiment of the present disclosure is not applied immediately when a transaction, a block, or a block file is generated, but may be timely applied in consideration of the efficiency (E) of the entire storage space in a blockchain system and the computation resources and storage space of blockchain nodes.

Also, rather than applying encoding to all blocks or block files, less frequently accessed block files (or blocks) are selected, and encoding may be performed on the selected block files (or blocks) only when load (L) imposed on the computation resource of a blockchain system is not large. Even though load (L) imposed on the computation resource of a blockchain system is large, if the storage space efficiency is significantly decreased, encoding may be performed in order to secure the storage space at step S1290.

Referring to FIG. 12, in the method for selecting an encoding target block file according to an embodiment of the present disclosure, the efficiency (E) of the entire storage space in a blockchain system is calculated at step S1210.

Also, in the method for selecting an encoding target block file according to an embodiment of the present disclosure, whether the calculated efficiency of the storage space is less than a preset comparison value threshold_E is determined at step S1220.

When it is determined at step S1220 that the efficiency of the storage space is not less than the preset comparison value, the operation is terminated because it is not necessary to secure storage space.

When it is determined at step S1220 that the efficiency of the storage space is less than the preset comparison value, a block access frequency B is collected at step S1230.

Also, when the efficiency of the storage space is less than the preset comparison value, a block file access frequency F is calculated at step S1240.

Also, in the method for selecting an encoding target block file according to an embodiment of the present disclosure, block files are arranged in order of access frequency using one or more of the block access frequency B, or the block file access frequency F, or a combination thereof at step S1250.

Also, in the method for selecting an encoding target block file according to an embodiment of the present disclosure, a less frequently accessed block file is selected using the arranged block files at step S1260.

Here, the less frequently accessed block file may be selected using information about whether the frequency of access to blocks included in the block file is less than a preset reference value threshold_F.

Also, in the method for selecting an encoding target block file according to an embodiment of the present disclosure, the load (L) on the computation resource of the blockchain system is calculated at step S1270.

Also, in the method for selecting an encoding target block file according to an embodiment of the present disclosure, whether the calculated load (L) on the computation resource is less than a preset reference value threshold_L is determined at step S1280.

When it is determined at step S1280 that the load on the computation resource is less than the reference value threshold_L, encoding is performed at step S1290.

When it is determined at step S1280 that the load on the computation resource is not less than the reference value threshold_L, the efficiency of the entire storage space is calculated again at step S1285.

Also, in the method for selecting an encoding target block file according to an embodiment of the present disclosure, whether the calculated efficiency of the entire storage space is less than a second reference value threshold_S is determined at step S1287. Then, when the efficiency of the entire storage space is less than the second reference value, encoding is performed by performing step S1290, whereas when the efficiency of the entire storage space is not less than the second reference value, the operation is terminated, because the efficiency of the entire storage space is not significantly decreased.

If the method for distributed storage of blockchain transaction data based on block file encoding according to an embodiment of the present disclosure is used, when access to a block stored in a distributed manner is required, the desired block may be immediately provided from the node that has the corresponding block, without the need to decode the same.

As described above with reference to FIG. 9, because all of blockchain nodes have hash values for the blocks that are not assigned thereto through blockchain transaction data encoding based on block file encoding, each node may check whether a block provided by another node is tampered with. Depending on the block, the process of deleting padding, which is added in order to make all of the blocks have the same size, may be required.

Figure 13:
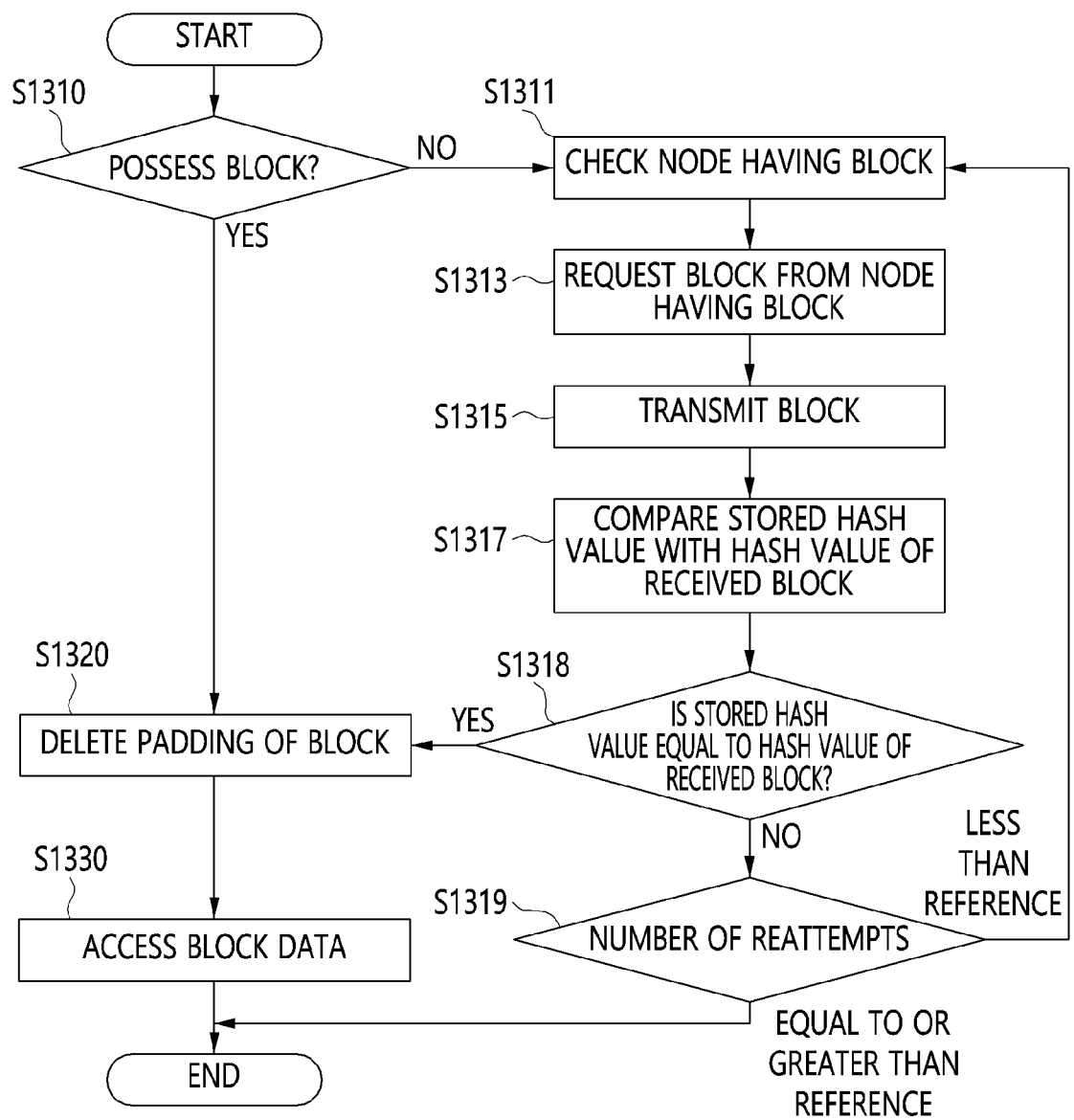
FIG. 13 is a flowchart illustrating an example of a block access method according to an embodiment of the present disclosure.

FIG. 13 is a flowchart illustrating an example of a block access method according to an embodiment of the present disclosure.

Referring to FIG. 13, in the block access method according to an embodiment of the present disclosure, whether a corresponding node has a requested block (chunk) is checked at step S1310.

When it is determined at step S1310 that the corresponding node has the requested block, unnecessary padding is deleted from the stored block at step S1320, and the requested block data is provided to a requester at step S1330.

When it is determined at step S1310 that the corresponding node does not have the requested block, a node having the requested block is checked at step S1311.

When the node having the requested block is identified, the requested block is requested from the corresponding node at step S1313, the block is received at step S1315, and the hash value of the received block is checked at step S1317. That is, at step S1317, the hash value of the received block is calculated, and the calculated hash value is compared with a previously stored hash value.

Also, in the block access method according to an embodiment of the present disclosure, whether the hash value of the received block is abnormal is checked.

When the hash value is normal, step S1320 is performed and block data is provided after deleting unnecessary padding, whereas when the hash value is abnormal, reattempts are made a preset number of times at step S1319.

That is, in the block access method according to an embodiment of the present disclosure, when the hash value possessed by the node is not equal to the hash value of the block provided from another node, the block is again provided from still another node having the corresponding block. Even though the block is received from all of the nodes having the corresponding block through multiple reattempts, when all of the hash values calculated based on the blocks received from the nodes are abnormal, the operation is terminated, and block access may be started again after the decoding and reencoding procedures to be described below are performed.

Figure 14:
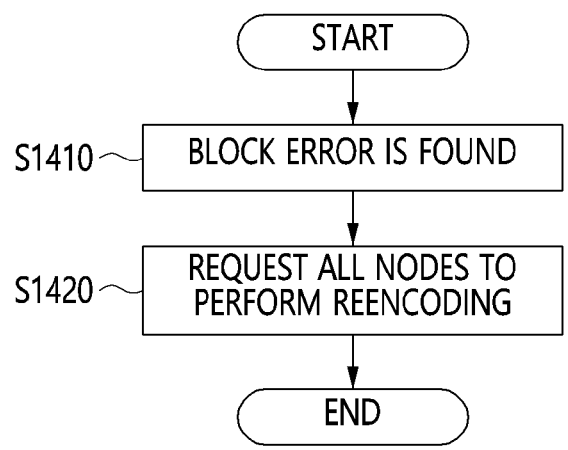
FIG. 14 is a flowchart illustrating an example of a reencoding method in a node that finds a block error according to an embodiment of the present disclosure.

FIG. 14 is a flowchart illustrating an example of a reencoding method in a node that finds a block error according to an embodiment of the present disclosure.

Referring to FIG. 14, it can be seen that a decoding procedure is performed when a problem (a storage node fault or Byzantine behavior) occurs in at least one of encoded blocks (chunks).

That is, when a block error is found at step S1410, a request for reencoding is made to all nodes at step S1420.

When a problem (a storage node fault or Byzantine behavior) does not occur in any of the encoded blocks (chunks), the desired block may be read immediately through the process illustrated in FIG. 13, without a decoding process.

However, when an error occurs in a data block, it may be necessary to restore the block through a reencoding process.

Figure 15:
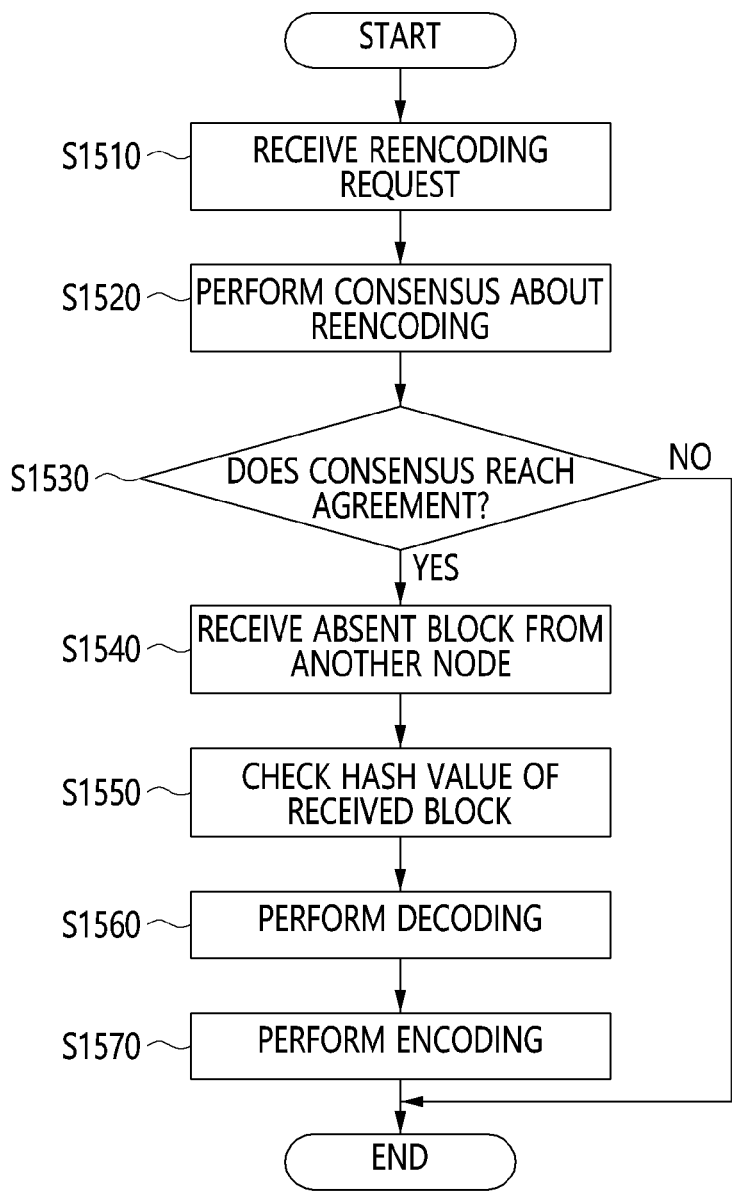
FIG. 15 is a flowchart illustrating an example of a reencoding method in a node that receives a reencoding request according to an embodiment of the present disclosure.

FIG. 15 is a flowchart illustrating an example of a reencoding method in a node receiving a reencoding request according to an embodiment of the present disclosure.

Referring to FIG. 15, blockchain nodes receive a reencoding request at step S1510.

The blockchain nodes, receiving the reencoding request, perform reencoding consensus at step S1520, and when the consensus fails, the operation is terminated.

When the consensus succeeds, each of the blockchain nodes, receiving the reencoding request, receives blocks (chunks) that are not possessed thereby from other nodes at step S1540 and check the hash values of the received blocks at step S1550.

When the hash values are normal, the blockchain nodes perform decoding at step S1560 and again encode the data acquired by decoding, thereby again generating encoded chunks at step S1570.

When new nodes, other than existing blockchain nodes, participate in a blockchain network, the number of nodes (N) is changed, and it may be impossible to guarantee BFT in the state in which existing encoded chunks are stored. The present disclosure enables blockchain transaction data encoding based on a block file using various encoding methods. Depending on the encoding method that is used, the encoding method may not require reencoding, or replication blocks have to be added in order to guarantee BFT. In some cases, BFT can be guaranteed only when reencoding described above with reference to FIG. 15 is performed.

Conversely, when a node participating in the blockchain network leaves the blockchain network or when a fault occurs in the node, a problem in which a block stored and managed by the corresponding node cannot be accessed may be caused.

Depending on the encoding method that is used and on the block managed by the corresponding node, the encoding method is capable of still guaranteeing BFT under this condition, or BFT may be guaranteed only when a relevant block is replicated or only when reencoding described with reference to FIG. 15 is performed.

Figure 16:
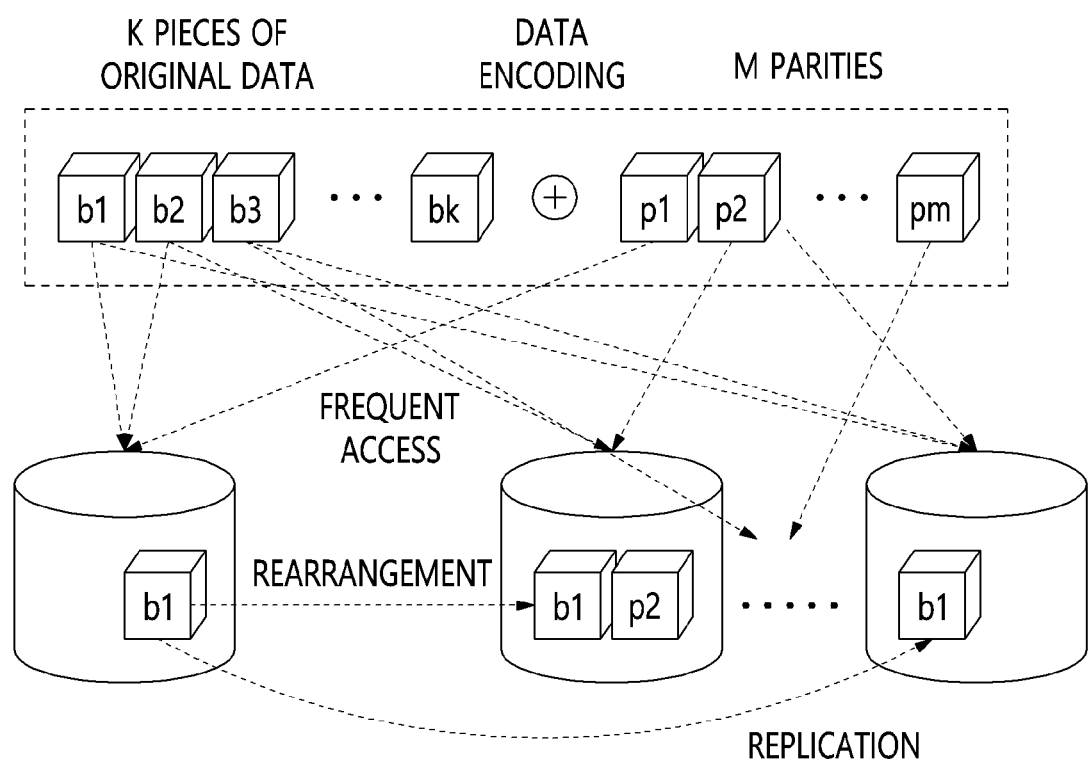
FIG. 16 is a view illustrating replication of frequently accessed blockchain transaction data in a system for distributed storage of blockchain transaction data according to an embodiment of the present disclosure.

FIG. 16 is a view illustrating replication of frequently accessed blockchain transaction data in a system for distributed storage of blockchain transaction data according to an embodiment of the present disclosure.

Referring to FIG. 16, it can be seen that, when a frequently accessed block is changed depending on a change in workloads in a blockchain network without a change in the number of nodes, the delay of access to the corresponding block can be minimized by increasing the number of replications of the corresponding block.

The configuration and operation method of the present disclosure described hitherto may be used and applied not only for a BFT-guaranteeing method for guaranteeing fault tolerance even when a fault occurs in up to ⅓ of participating nodes but also for various guarantee levels at which more availability or less availability is guaranteed.

As described above, when block-file-based encoding according to the present disclosure is applied, the amount of data stored in each node is reduced in a blockchain system storing a huge amount of blockchain transaction data, whereby the storage space efficiency of the entire blockchain network may be improved and a large amount of blockchain data may be stored and managed using a smaller number of nodes.

Also, blockchain distributed storage technology using block-file-based encoding according to the present disclosure may be widely applied to general forms of blockchain platforms that are configured to store and manage blockchain transaction data in a file system.

Figure 17:
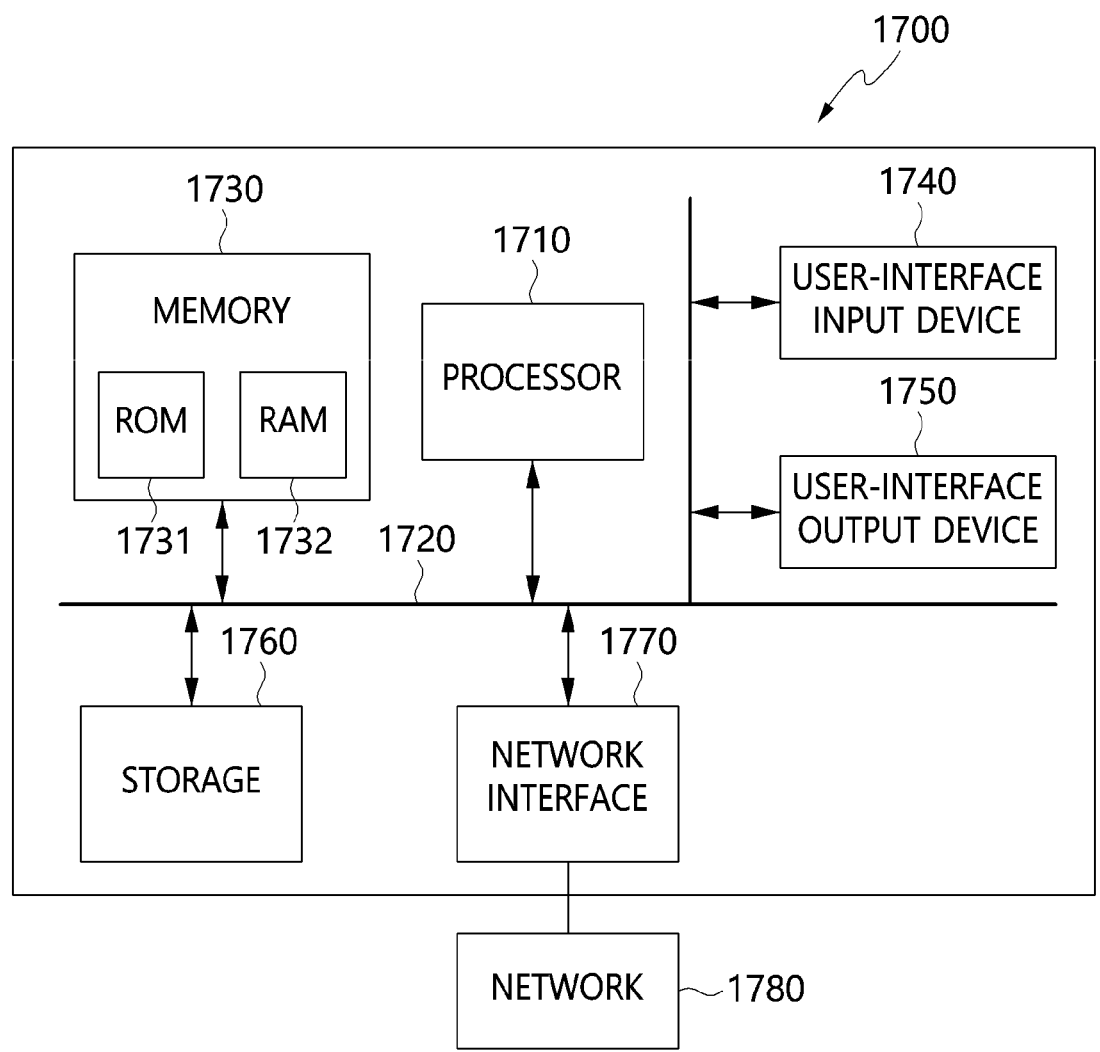
FIG. 17 is a block diagram illustrating a computer system configuration according to an embodiment of the present disclosure.

FIG. 17 is a block diagram illustrating a computer system configuration according to an embodiment of the present disclosure.

The apparatus for storing blockchain transaction data and the nodes constituting a blockchain according to an embodiment may be implemented in a computer system 1700 including a computer-readable recording medium.

The computer system 1700 may include one or more processors 1710, memory 1730, a user-interface input device 1740, a user-interface output device 1750, and storage 1760, which communicate with each other via a bus 1720. Also, the computer system 1700 may further include a network interface 1770 connected to a network 1780. The processor 1710 may be a central processing unit or a semiconductor device for executing a program or processing instructions stored in the memory 1730 or the storage 1760. The memory 1730 and the storage 1760 may be storage media including at least one of a volatile medium, a non-volatile medium, a detachable medium, a non-detachable medium, a communication medium, or an information delivery medium, or a combination thereof. For example, the memory 1730 may include ROM 1731 or RAM 1732.

Here, at least one program may be recorded in the memory 1730.

Here, the processor 1710 may execute the program. Here, the program may select at least one block file storing blockchain transactions as an encoding block file target, generate encoded chunks including parity chunks using the encoding block file target, and make at least one of the encoded chunks correspond to at least one of blockchain nodes to store at least one of the encoded chunks.

Here, the number of parity chunks is M (M being a natural number), the number of blockchain nodes is 3M+1, the number of encoded chunks is 3M+1, and the encoded chunks may correspond to the blockchain nodes in a one-to-one manner.

Here, each of the blockchain nodes may store a corresponding one of the encoded chunks without change and store only hash values for at least some of the remaining chunks excluding the corresponding one.

Here, the program may determine whether the number of blocks included in the encoding block file target is 2M+1, and when the number of blocks included in the encoding block file target is not equal to 2M+1, the program may generate 2M+1 encoding target blocks using the blocks included in the encoding block file target and replicated blocks, which are some of the blocks included in the encoding block file target. Here, the encoded chunks may be generated by performing encoding using the encoding target blocks.

Here, the replicated blocks may be selected from among the blocks included in the encoding block file target based on an access frequency.

Here, the encoding block file target may include 2M+1 or fewer blocks.

Here, the 2M+1 or fewer blocks have different sizes, and padding may be added thereto based on a maximum block size before the encoded chunks are generated.

Here, the encoding block file target may be selected from among the block files storing the blockchain transactions in consideration of the frequencies of access to the block files or access to blocks included in the block files.

Here, a hash value may be used to verify a block read from another node.

Here, 2M+1 or more of the encoded chunks may be used for decoding for restoring the encoding target blocks.

According to the present disclosure, a problem in which transaction data that is redundantly stored in participating nodes of a blockchain network in order to ensure data reliability in the existing blockchain system causes a limitation in scalability from the aspects of space efficiency and the capacity of storage space of transaction data even though the number of participating nodes is increased in the blockchain network may be solved.

Also, according to the present disclosure, blockchain transaction data is stored to be distributed across multiple participating nodes while guaranteeing Byzantine fault tolerance, whereby storage space efficiency may be improved and the storage space usage in each participating node may be minimized.

Also, according to the present disclosure, the storage space efficiency of participating nodes is improved and the storage space usage by the participating nodes is minimized, whereby the storage capacity of an entire blockchain system may be maximized.

As described above, the method and apparatus for storing blockchain transaction data and the system for distributed storage of blockchain transaction data according to the present disclosure are not limitedly applied to the configurations and operations of the above-described embodiments, but all or some of the embodiments may be selectively combined and configured, so the embodiments may be modified in various ways.

What is claimed is:

1. A method for storing blockchain transaction data, performed by an apparatus for storing blockchain transaction data, comprising:
   selecting at least one block file storing blockchain transactions as an encoding block file target;
   determining whether a number of blocks included in the encoding block file target is 2M+1 (M being a natural number):
   when the number of blocks included in the encoding block file target is not equal to 2M+1, generating 2M+1 encoding target blocks using the blocks included in the encoding block file target and replicated blocks, the replicated blocks being part of the blocks included in the encoding block file target;
   generating encoded chunks, including parity chunks, using the encoding target blocks; and
   making at least one of the encoded chunks correspond to at least one of blockchain nodes to store at least one of the encoded chunks,
   wherein a number of parity chunks is M, a number of blockchain nodes is 3M+1, a number of encoded chunks is 3M+1, and each of the encoded chunks is mapped to a respective one of the blockchain nodes, and
   wherein each of the blockchain nodes stores a corresponding one of the encoded chunks and stores only hash values for at least part of remaining chunks excluding the corresponding one.

2. The method of claim 1, wherein the replicated blocks are selected from among the blocks included in the encoding block file target based on an access frequency.

3. The method of claim 1, wherein the encoding block file target includes 2M+1 or fewer blocks.

4. The method of claim 3, wherein the 2M+1 or fewer blocks have different sizes, and padding is added thereto based on a maximum block size before the encoded chunks are generated.

5. The method of claim 1, wherein the encoding block file target is selected from among block files storing the blockchain transactions in consideration of frequencies of access to the block files or blocks included in the block files.

6. The method of claim 1, wherein the hash value is used to verify a block read from another node.

7. The method of claim 1, wherein 2M+1 or more of the encoded chunks are used for decoding for restoring the encoding target blocks.

8. An apparatus for storing blockchain transaction data, comprising:
one or more processors; and
executable memory for storing at least one program executed by the one or more processors,
wherein the at least one program is configured to
select at least one block file storing blockchain transactions as an encoding block file target,
generate encoded chunks, including parity chunks, using the encoding block file target, and
make at least one of the encoded chunks correspond to at least one of blockchain nodes to store at least one of the encoded chunks,
wherein a number of parity chunks is M (M being a natural number), a number of blockchain nodes is 3M+1, a number of the encoded chunks is 3M+1, and each of the encoded chunks is mapped to a respective one of the blockchain nodes,
wherein each of the blockchain nodes stores a corresponding one of the encoded chunks and stores only hash values for at least part of remaining chunks excluding the corresponding one, and wherein:
the at least one program determines whether a number of blocks included in the encoding block file target is 2M+1,
when the number of blocks included in the encoding block file target is not equal to 2M+1, the at least one program generates 2M+1 encoding target blocks using the blocks included in the encoding block file target and replicated blocks, the replicated blocks being part of the blocks included in the encoding block file target, and
the encoded chunks are generated by performing encoding using the encoding target blocks.

9. The apparatus of claim 8, wherein the replicated blocks are selected from among the blocks included in the encoding block file target based on an access frequency.

10. The apparatus of claim 8, wherein:
the encoding block file target includes blocks having different sizes, and
padding is added to the blocks having the different sizes based on a maximum block size before the encoded chunks are generated.

11. The apparatus of claim 8, wherein the encoding block file target is selected from among block files storing the blockchain transactions in consideration of frequencies of access to the block files or blocks included in the block files.

12. The apparatus of claim 8, wherein the hash value is used to verify a block read from another node.

13. The apparatus of claim 8, wherein 2M+1 or more of the encoded chunks are used for decoding for restoring the encoding target blocks.

* * * * *